United States Patent
Fischperer et al.

(10) Patent No.: US 10,343,534 B2
(45) Date of Patent: Jul. 9, 2019

(54) ARRANGEMENT, SYSTEM AND METHOD FOR INDUCTIVELY TRANSMITTING ENERGY FOR CHARGING AT LEAST ONE ENERGY STORE OF A RAIL VEHICLE

(71) Applicant: SIEMENS AKTIENGESELLSCHAFT, Munich (DE)

(72) Inventors: Rolf Fischperer, Igensdorf (DE); Jens Helfrich, Speyer (DE); Jochen Mast, Heidelberg (DE); Michael Meinert, Erlangen (DE); Jean Schutz, Neulussheim (DE)

(73) Assignee: Siemens Mobility GmbH, Munich (DE)

( * ) Notice: Subject to any disclaimer, the term of this patent is extended or adjusted under 35 U.S.C. 154(b) by 262 days.

(21) Appl. No.: 15/312,705

(22) PCT Filed: May 8, 2015

(86) PCT No.: PCT/EP2015/060153
§ 371 (c)(1),
(2) Date: Nov. 21, 2016

(87) PCT Pub. No.: WO2015/176971
PCT Pub. Date: Nov. 26, 2015

(65) Prior Publication Data
US 2017/0182895 A1    Jun. 29, 2017

(30) Foreign Application Priority Data

May 20, 2014   (DE) ........................ 10 2014 209 501

(51) Int. Cl.
*B60L 11/18*     (2006.01)
*H02J 7/02*      (2016.01)
(Continued)

(52) U.S. Cl.
CPC ........... *B60L 11/1812* (2013.01); *B60L 5/005* (2013.01); *B60L 53/12* (2019.02); *H02J 7/025* (2013.01);
(Continued)

(58) Field of Classification Search
CPC ...... B60L 9/00; B60L 9/16; B60L 9/24; B60L 11/00; B60L 11/18; B60L 11/1803; B60L 11/1809; B60L 11/1811; B60L 11/1812
See application file for complete search history.

(56) References Cited

U.S. PATENT DOCUMENTS 5,654,621 A * 8/1997 Seelig .................. B60L 11/182
                                                              320/108
6,037,745 A    3/2000 Koike et al.
(Continued)

FOREIGN PATENT DOCUMENTS

DE   19824290 A1   12/1999
EP    2415627 A2    2/2012

OTHER PUBLICATIONS

Seung Beop Lee, et al., "Optimization of the wireless power transfer system in an electric railway", 2014, pp. 158-161.
(Continued)

*Primary Examiner* — Robert J McCarry, Jr.
(74) *Attorney, Agent, or Firm* — Laurence Greenberg; Werner Stemer; Ralph Locher

(57) ABSTRACT

An arrangement for inductively transmitting energy for charging an energy storage device of a rail vehicle. A first induction element transfers energy to a second induction element. An inverter with an adjustable AC voltage frequency provides an AC voltage to the first induction element. A controller controls the AC voltage frequency of the inverter. A measuring device ascertains a power output value during the wireless energy transmission and transmits the
(Continued)

value to the controller and the controller adjusts AC voltage frequency of the inverter downward from an upper threshold until a pre-specified power output value is set while energy is being transmitted. The first induction element is paired with a track for rail traffic. The system and a method are also described for inductively transmitting energy for charging an energy storage device of a rail vehicle.

26 Claims, 8 Drawing Sheets

(51) Int. Cl.
  *H02J 50/10*  (2016.01)
  *H02J 50/40*  (2016.01)
  *B60L 5/00*  (2006.01)
  *B60L 53/12*  (2019.01)

(52) U.S. Cl.
  CPC .............. *H02J 50/10* (2016.02); *H02J 50/40* (2016.02); *B60L 2200/26* (2013.01); *B60L 2210/30* (2013.01); *Y02T 10/7005* (2013.01); *Y02T 10/7072* (2013.01); *Y02T 90/122* (2013.01); *Y02T 90/14* (2013.01); *Y02T 90/16* (2013.01)

(56) References Cited

U.S. PATENT DOCUMENTS

| | | |
|---|---|---|
| 9,421,868 B2 | 8/2016 | Oyobe et al. |
| 2011/0227420 A1 | 9/2011 | Urano |
| 2012/0161530 A1 | 6/2012 | Urano |
| 2013/0134797 A1 | 5/2013 | Kanno |
| 2013/0270919 A1* | 10/2013 | Miller ..................... H01F 38/14 |
| | | 307/104 |
| 2013/0334896 A1 | 12/2013 | Yamamoto |
| 2014/0015329 A1* | 1/2014 | Widmer ............... G01D 5/2006 |
| | | 307/104 |
| 2014/0015340 A1 | 1/2014 | Ito et al. |
| 2014/0055090 A1* | 2/2014 | Krause .................. B60L 11/182 |
| | | 320/108 |
| 2014/0091637 A1 | 4/2014 | Endo et al. |
| 2014/0125140 A1 | 5/2014 | Widmer et al. |
| 2014/0125142 A1 | 5/2014 | Kanno |

OTHER PUBLICATIONS

Takanashi H., et al., "A Large Air Gap 3 kW Wireless Power Transfer System for Electric Vehicles", 2012, pp. 269-274.

\* cited by examiner

ARRANGEMENT, SYSTEM AND METHOD FOR INDUCTIVELY TRANSMITTING ENERGY FOR CHARGING AT LEAST ONE ENERGY STORE OF A RAIL VEHICLE

BACKGROUND OF THE INVENTION

Field of the Invention

The invention relates to an arrangement for inductive energy transmission for charging an energy storage device of a rail vehicle as claimed and a system and a method as claimed.

Methods are known for the inductive charging of energy stores of electrically operated vehicles, such as for example, electric cars, electric buses or for trams suitable for operation without overhead contact lines by means of energy transmission devices embedded in the carriageway or in the rail track. The website www.wampfler.com (under "Energy & Data transmission/Inductive Power Transfer IPT") shows vehicles that are charged when they stop over a charging point. This takes place in that a mechanical system is used to lower an energy absorption device from the vehicle onto the energy transmission device so that it is always possible to set a prespecified air gap between the energy transmission device and the energy absorption device.

If the use of a mechanical system of this kind to adapt the air gap between the energy absorption device and the energy transmission device is to be avoided, the parameters of the energy transmission have to be adapted in accordance with the distance, in particular for the formation of a resonance. This can, for example, take place by adapting the AC voltage frequency during the energy transmission.

Known from EP2415627 A2 is a generic arrangement for inductive energy transmission for charging an energy store of a vehicle with which the efficiency of the energy transmission is measured on-board and transmitted to a controller on the carriageway side, which enables efficient energy transmission by means of the adaptation of the AC voltage frequency. During this, the data transmission between the vehicle and the controller at the carriageway side controller has to take place very quickly and reliably to enable reactions at all times to a changing distance, for example by changing the spring spacing when people embark and disembark the vehicle.

BRIEF SUMMARY OF THE INVENTION

It is the object of the invention to disclose a generic arrangement which is suitable for enabling relatively simple, quick and reliable energy transmission between the energy transmission device and energy absorption device in the case of a variable distance between the energy transmission device and energy absorption device.

The invention achieves this object by means of an arrangement for inductive energy transmission for charging an energy store of a rail vehicle comprising at least one first induction element, which is suitable for wirelessly transmitting energy to at least one second induction element, and an inverter the AC voltage frequency of which can be controlled, wherein the inverter is suitable for providing an AC voltage with the AC voltage frequency to the at least one first induction element, and a controller, which is suitable for controlling the AC voltage frequency of the inverter and a measuring device, which is suitable for ascertaining a measurement value when wirelessly transmitting energy from the at least one first to the at least one second induction element and transmitting said measurement value to the controller, characterized in that the measuring device is suitable for measuring a power output value as the measurement value and that the controller is suitable for adjusting down the AC voltage frequency of the inverter from an upper threshold until a previously specified power output value is set while energy is being transmitted and that the first induction element is paired with a track for the rail traffic.

In this case, it is provided that the first induction element of the arrangement serves as a transmitter of electrical energy and this electrical energy can be transmitted via a variable air gap to a second induction element, which is preferably paired with a vehicle. The variable distance is then, for example, specified by the vehicle's ground clearance. In the context of the present invention, the transmitting part is referred to as the primary side and the receiving part as the secondary side.

In this context, the primary side can, for example, be supplied directly with electricity from a DC network such as, for example, a DC rail traction supply.

One advantage of the arrangement according to the invention is that it is able to charge an energy store of a rail vehicle without mechanical adaptation of the size of the air gap thus facilitating suitability for use in rail traffic under different loading conditions of a vehicle. Here, one particular advantage compared to the known arrangement is that the energy transmission can be controlled quickly and reliably.

It is a further advantage of the arrangement according to the invention that high transmission efficiency can be guaranteed with a simple and compact mechanical design.

It is not, for example, necessary to lower a vehicle to form a prespecified distance between the induction elements. The arrangement is able to work with optimal efficiency with different air gaps, such as occur, for example, during the operation of a vehicle due to vehicle wheel wear and spring compression (i.e. at the resonance point with maximum transmission efficiency) and simultaneously guarantee the necessary ground clearance while traveling, in particular also with low-floor vehicles with limited installation space.

Due to the variable distance between the primary part and secondary part, changes occur to the magnetic parameters in the so-called transmission circuit, i.e. in the arrangement according to the invention, in particular the leakage inductances and the principal inductances, thus causing the resonance point of the energy transmission to change. This new resonance point can be reached quickly and reliably by means of the re-adjustment principle according to the invention in order to ensure efficient energy transmission.

To guarantee optimal power transmission, the supply to the primary part takes place at the resonance point. To this end, a controller is used which automatically finds the resonance point and automatically re-adjusts it in the event of changes in the magnetic circuit.

The controller controls the resonance point as follows:

The power output value in the primary part at which energy transmission is intended is specified (this is generally, at the resonance point with maximum efficiency of the energy transmission), independently of the geometry (air gap). At the start, the AC voltage frequency is set at the upper threshold; the power output value is measured, for example from the shift of the zero passages between the prespecified primary voltage and the primary current resulting therefrom. The AC voltage frequency is then lowered until the desired power output value is present. The energy transmission then takes place at this frequency (for example at the resonance point). No further lowering of the frequency is provided since the efficiency of the power transmission falls again below the resonance frequency. The frequency is set using the radio-frequency inverter that already has to be provided for the energy transmission.

The resonance point has to be re-adjusted if it changes during the charging process, for example due to passengers embarking/disembarking. The change to the air gap causes a change to the inductances of the arrangement. Since the compensation capacitors have a fixed value, the resonance point changes. The change to the resonance point causes the phase angle to change as well. The phase angle is automatically identified and re-adjusted by the controller.

If the power to be transmitted is to be changed, for example because the on-board energy store is full and further power is only required for the auxiliary modes, this can be notified to the arrangement by a signal (commercially available radio/data transmission systems or optical systems are possible) from the vehicle. The arrangement then increases the frequency. As a result, the resonance point is left, the active components in the primary current abate, reactive components increase. The reduction in the active components causes a reduction in the transmitted power. The controller increases the frequency until the desired power is achieved.

A further advantage of the arrangement according to the invention is the provision of overcurrent protection. If, for example due to errors, impermissibly high currents occur, the controller can immediately set comparatively high frequencies so that very high impedances are present at a far distance from the resonance point. This limits the transmitted current to permissible values. The controller can remain operational and continue to work without further measures following the rectification of the (possibly transient) fault. Since operation preferably entails a transmission ratio of 1:1 between the primary part and secondary part and it is possible that there may be reactive currents on the primary side, the current on the secondary side cannot be greater than on the primary side. As a result, the secondary side is automatically protected against overcurrents. In addition, the current limit can be specified variably in dependence on the phase angle so that, if necessary, it is possible to control operating points that could result in impermissibly high values on the secondary side.

A further advantage is that—when inverters are provided on the secondary side—energy transmission is possible in both directions. Therefore, in certain situations, it is also possible for energy to be fed from a vehicle battery back into a stationary energy store.

In one preferred embodiment of the arrangement according to the invention, the upper threshold is between 15 kHz and 20 kHz. This is advantageous because particularly efficient energy transmission can be achieved at these frequencies and the frequencies are outside the human auditory spectrum.

In a further preferred embodiment of the arrangement according to the invention, the measuring device and the controller are suitable for using the power factor as the power output value. The power factor is defined as the ratio of active power to reactive power. This is advantageous since the power factor enables a simple measurement of the efficiency of the energy transmission.

In a further preferred embodiment of the arrangement according to the invention, the measuring device is embodied to determine the power factor by means of the phase difference between voltage and current. This method is advantageous because it is simple to use.

In another preferred embodiment of the arrangement according to the invention, the controller is configured to set a power factor of 1 as standard during the energy transmission. This is an advantageous because optimal energy transmission is guaranteed with power factor of 1.

In another preferred embodiment of the arrangement according to the invention, a communication device is provided which is suitable for receiving signals about the power to be transmitted and/or a power factor that is currently to be set and for transmitting them to the controller. This is advantageous because it enables the desired energy consumption on the receiver side (i.e. secondary side) to be controlled at the transmitter side (i.e. primary side).

In a further preferred embodiment of the arrangement according to the invention, the controller is configured to use the signals to set a power factor of less than 1 by increasing the AC voltage frequency. This is advantageous because, with a power factor of less than 1, it is possible to set lower energy consumption on the receiver side, for example if the battery of a vehicle is already almost fully charged.

In a further preferred embodiment of the arrangement according to the invention the controller is suitable, in the event of an error, in particular in the case of excessively high currents, for limiting the currents by increasing the AC voltage frequency. This is advantageous because this causes the energy consumption on the receiver side to be limited quickly thus enabling damage to be avoided.

In a further preferred embodiment of the arrangement according to the invention, the measuring device is paired with the at least one first induction element. This is advantageous because the measurement at the sender side (i.e. primary side) and the setting of the AC voltage frequency of the energy transmission resulting therefrom enable the properties of the energy transmission to be set very quickly and reliably. In particular, it is no longer necessary to transmit measurement data from the receiver side, i.e. for example a vehicle, which takes longer and is more susceptible to error.

In a further preferred embodiment of the arrangement according to the invention, the controller is suitable for controlling the AC voltage frequency within a time of a few AC voltage periods, preferably fewer than two AC voltage periods, and to set the previously specified efficiency value. This is advantageous because it enables particularly quick adaptation of the energy transmission.

In a further preferred embodiment of the arrangement according to the invention, at least one first compensation capacitor is provided for the compensation of a first leakage inductance, wherein the at least one first compensation capacitor is connected in series to the at least one first induction element. This is advantageous because a series resonance circuit is particularly well suited for efficient energy transmission. The design of an inductive transmitter in series resonance enables an operating range for the AC voltage frequency with a constant phase pattern in relation to frequency, so that the controller can adjust the desired phase angle (in particular also 0°). This enables different transformer parameters (and also air gaps) of the induction elements to be controlled and account to be taken of power specifications and current limits. A further advantage is that, compared to a construction in parallel resonance, a construction in series resonance has a comparatively high degree of efficiency, enables a high degree of power transmission and is simple to control in accordance with the invention. The "parallel resonance" (compensation of both the leakage inductance and the principal inductance by compensation capacitors parallel to the transformer terminal) usual in the prior art is dispensed with here.

In a further preferred embodiment of the arrangement according to the invention, the at least one first induction element is arranged on the rail side. This is advantageous because it enables a vehicle to travel on the carriageway or the rail track and then stop over the first induction element in order to charge its energy store.

In a further preferred embodiment of the arrangement according to the invention a precharging device is provided for precharging an intermediate circuit capacitor. This is advantageous because it enables the intermediate circuit capacitor to be precharged in a simple way before the energy transmission process commences.

In a further preferred embodiment of the arrangement according to the invention, the arrangement comprises a DC voltage controller arranged upstream of the inverter. This is advantageous because, instead of the specification of a variable phase, the phase can remain constant at 0° at the resonance point. To enable changes to power or current, the DC voltage controller can convert the mains voltage to a different voltage for the inverter. In this case, the DC voltage controller can be equipped with capacitors and chokes for smoothing the voltage. However, these elements limit the possible adjustment speed for the voltage and hence the power and current to a few 10 ms, i.e. this limits the speed of reaction of the arrangement. On the other hand, with the arrangement according to the invention, it is possible to react almost immediately (within a period, i.e. in the region of 100 μs) by adjusting the frequency.

Also part of the present invention is a system for inductive energy transmission for charging an energy store of a rail vehicle comprising an arrangement as claimed in any one of the preceding claims and at least one second induction element, which is arranged at a distance from the at least one first induction element, wherein the second induction element is paired with the rail vehicle and a rectifier for the provision of direct voltage to the energy store, wherein at least one second compensation capacitor is provided for the compensation of second leakage inductance, wherein the at least one second compensation capacitor is connected in series to the at least one second induction element.

In one preferred embodiment of the system according to the invention, the at least one second induction element is arranged substantially coplanar with the at least one first induction element. The coplanar arrangement is advantageous because overall it achieves a uniform distance between the induction elements thus improving the efficiency and controllability of the energy transmission.

In one preferred embodiment of the system according to the invention, the induction elements are of the same size. This is advantageous because, with optimal positioning of the induction elements with respect to one another this enables the achievement of particularly efficient energy transmission with a comparatively small construction.

In one preferred embodiment of the system according to the invention, one of the two at least one induction elements is embodied larger than the other at least one induction element such that inaccuracies in the positioning of the induction elements can be mutually compensated and complete coverage of the smaller induction element by the larger induction element is ensured. In this case, the larger induction element, in particular on the primary side, is between 5% and 30% longer and/or wider than the smaller induction element. This is advantageous because, for example, it enables a vehicle to be charged by an induction element arranged on the ground without major adaptations to the vehicle's position.

In another preferred embodiment of the system according to the invention, the induction elements have a metallic core material (in particular ferrite) for guiding the magnetic field. This is advantageous because it enables the geometry of the magnetic field to be selected for optimal energy transmission. This also has the result that it also enables a flat and large-area construction for installation under the base of the vehicle for guiding a high energy density in the air gap. The shape of the transmitter can, for example, be defined by a prefabricated sleeve made of plastic.

In another preferred embodiment of the system according to the invention, the induction elements in each case comprise at least one core made of stranded conductors enclosing the core material. This is advantageous because stranded conductors prevent losses due to eddy currents.

In another preferred embodiment of the system according to the invention, the controller is suitable for controlling the AC voltage frequency constantly during energy transmission in order to compensate changes in the distance between the induction elements. This is advantageous because, for example if, when passengers are embarking and disembarking a rail vehicle, the changing loading situation causes the distance between the induction elements to be changed, it is also possible to guarantee optimal energy transmission.

In another preferred embodiment of the system according to the invention, this distance is between 70 mm and 300 mm, preferably between 80 mm and 250 mm, still more preferably between 90 mm and 220 mm. This is advantageous because suburban rail vehicles typically have ground clearances within this range.

In another preferred embodiment of the system according to the invention, in each case a plurality of compensation capacitors are paired with the at least one first and the at least one second induction element in order to limit the voltage applied to an individual compensation capacitor. In this case, the compensation capacitors preferably have the same capacitance.

In another preferred embodiment of the system according to the invention, a plurality of first induction elements and a plurality of second induction elements are provided.

In another preferred embodiment of the system according to the invention, the rectifier comprises switchable semiconductor elements, which are suitable for limiting the voltage applied to the at least one second induction element by triggering a short circuit.

Also part of the invention is a method for inductive energy transmission for charging at least one energy store of a rail vehicle part, wherein the method comprises the following method steps:

provision of an AC voltage with an AC voltage frequency by means of an inverter to at least one first induction element, wherein the first induction element is paired with a track for the rail traffic; and controlling the AC voltage frequency by means of a controller; and wireless transmission of energy from at least one first induction element to at least one second induction element, wherein the second induction element is paired with the rail vehicle; and measuring a power output value during the wireless transmission of energy between the induction elements by means of a measuring device; and transmission of the measured power output value to the controller; and rectification of the AC voltage applied to the least second induction element by means of a rectifier; and charging of the energy store of the vehicle with the rectified voltage, wherein the AC voltage frequency is adjusted down from an upper threshold until a previously specified power output value is set during the energy transmission.

Preferred embodiments of the method according to the invention can also be derived from further claims. The method according to the invention and the embodiments analogously have the same advantages as those described in the introduction for the arrangement according to the invention.

The figures are preferably schematic depictions of exemplary embodiments of the invention. The features of the individual exemplary embodiments can always be combined in order to achieve further exemplary embodiments of the invention that are not shown.

DESCRIPTION OF THE INVENTION

Figure 1:
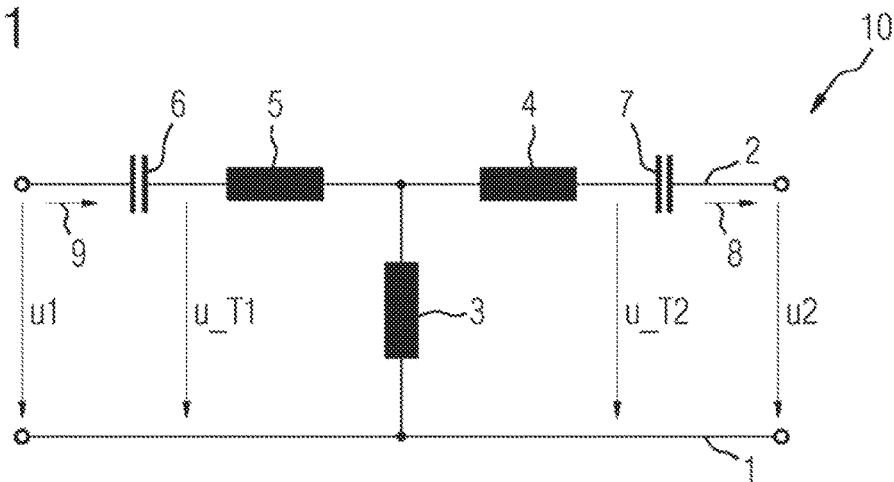
FIG. 1 an equivalent circuit diagram for a series resonance system for inductive energy transmission, FIG. 2 a phasor diagram of voltages and currents such as occur in the resonant-mode operation of the arrangement as shown in FIG. 1, FIG. 3 a line chart for the frequency-dependent course of phase and impedance during the operation of a system as shown in FIG. 1, FIG. 4 an exemplary embodiment of an induction element, FIG. 5 a line chart of a calculated frequency dependency of the power factor during energy transmission taking account of the distance between the induction elements, FIG. 6 an exemplary embodiment of a system according to the invention as a block diagram, FIG. 7 a structure diagram of the control of the AC voltage frequency according to the invention, FIG. 8 an exemplary embodiment of the arrangement according to the invention with an interrupting device and a precharging device, FIG. 9 an exemplary embodiment of the receiver side of a system according to the invention with short-circuiters.

FIG. 1 shows an idealized equivalent circuit diagram 10 (resistances not shown) for a series resonance system for inductive energy transmission. The primary-side and secondary-side compensation capacitors 6, 7 are connected in series to the leakage inductances 4, 5 and dimensioned such that the products with the leakage inductances on the primary and secondary sides have a zero point at the same frequency. The principal inductance 3 is not compensated. Hence, the voltages u1, u2, u_T1 and u_T2 result between the lines 1 and 2.

Figure 2:
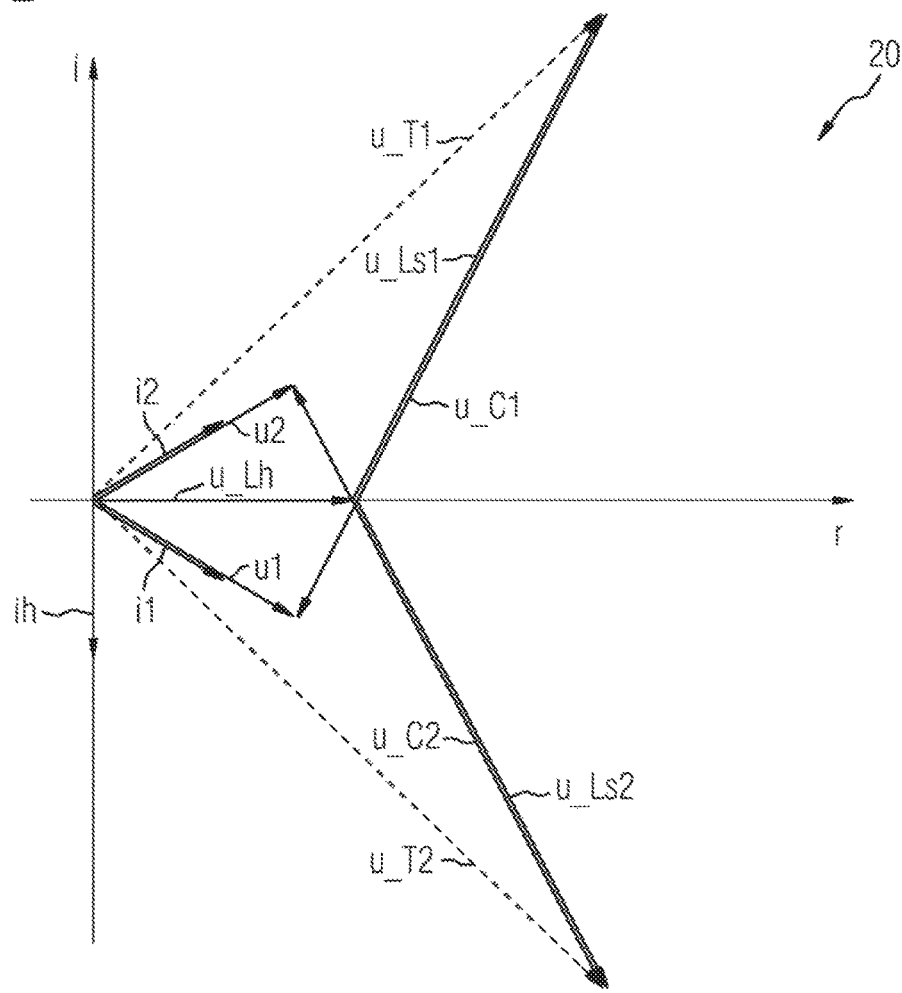

FIG. 2 is a phasor diagram 20 with an imaginary axis i and a real axis r for the voltages u_T1, u_T2, u_C1, u_C2, u1, u2, u_Ls1, u_Ls2 and currents i1, i2, ih such as occur in the resonant-mode operation of the system as shown in FIG. 1. In this case, current and voltage are in phase on both the primary side secondary side; active power is transmitted. It is also evident that a comparatively low voltage u1 is to be applied for the transmitted power. The series resonance also means that the magnetization voltage u_Lh is small.

Figure 3:
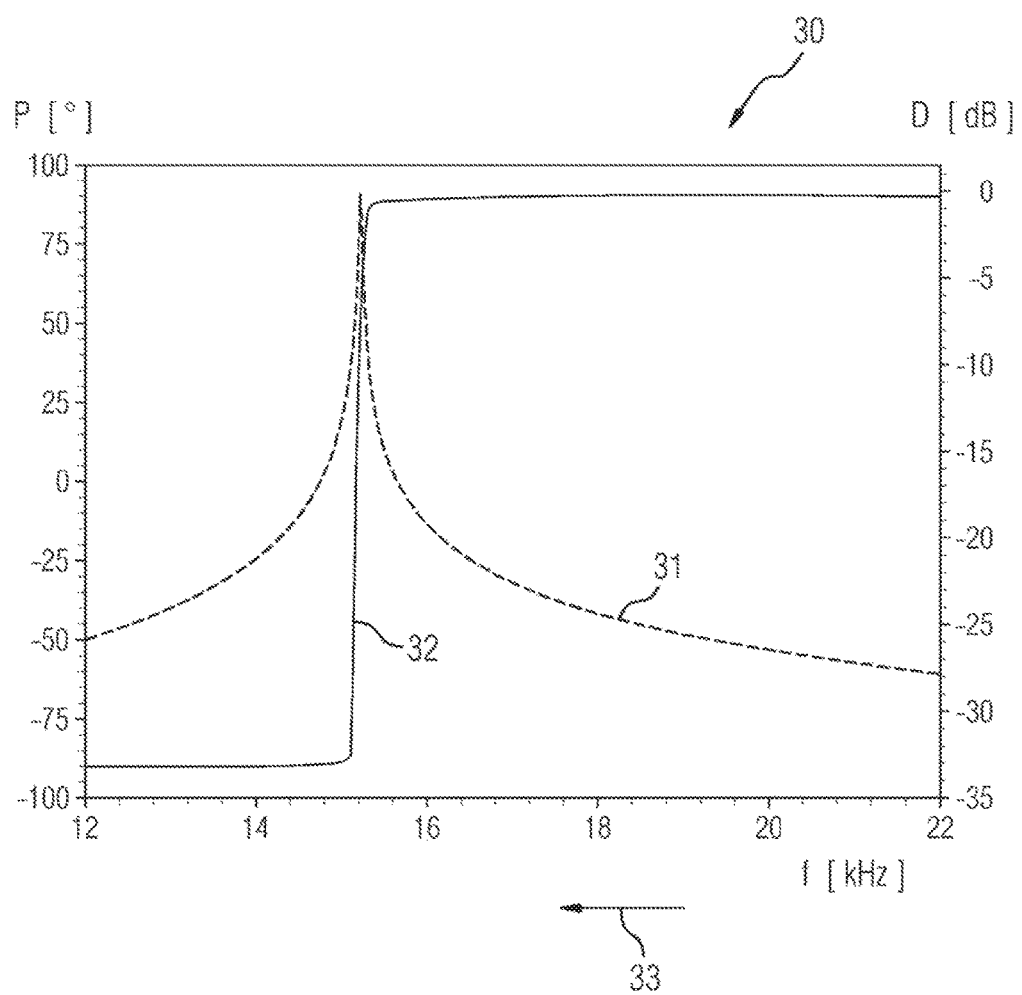

FIG. 3 is a line chart 30 showing the frequency-dependent course of phase and impedance during the operation of a system as shown in FIG. 1. These are simulated courses with a passive load: plotted in relation to the frequency f are the phase angle P of a current with the curve 32 produced with the given voltage (phase=0°, reference phase) and the relative current amplitude (attenuation) D in dB with the curve 31. There is a resonance point at phase 0° in which the attenuation (impedance) is minimal. Further away from the resonance point (in the direction of high frequencies), the attenuation increases, i.e. the current amplitude is smaller and the phase angle approaches 90°. In particular, the effect of the circuit is that there is not a plurality of resonance points so that there is a constant relationship between frequency and phase. Hence, the phase can be controlled via the frequency.

Figure 4:
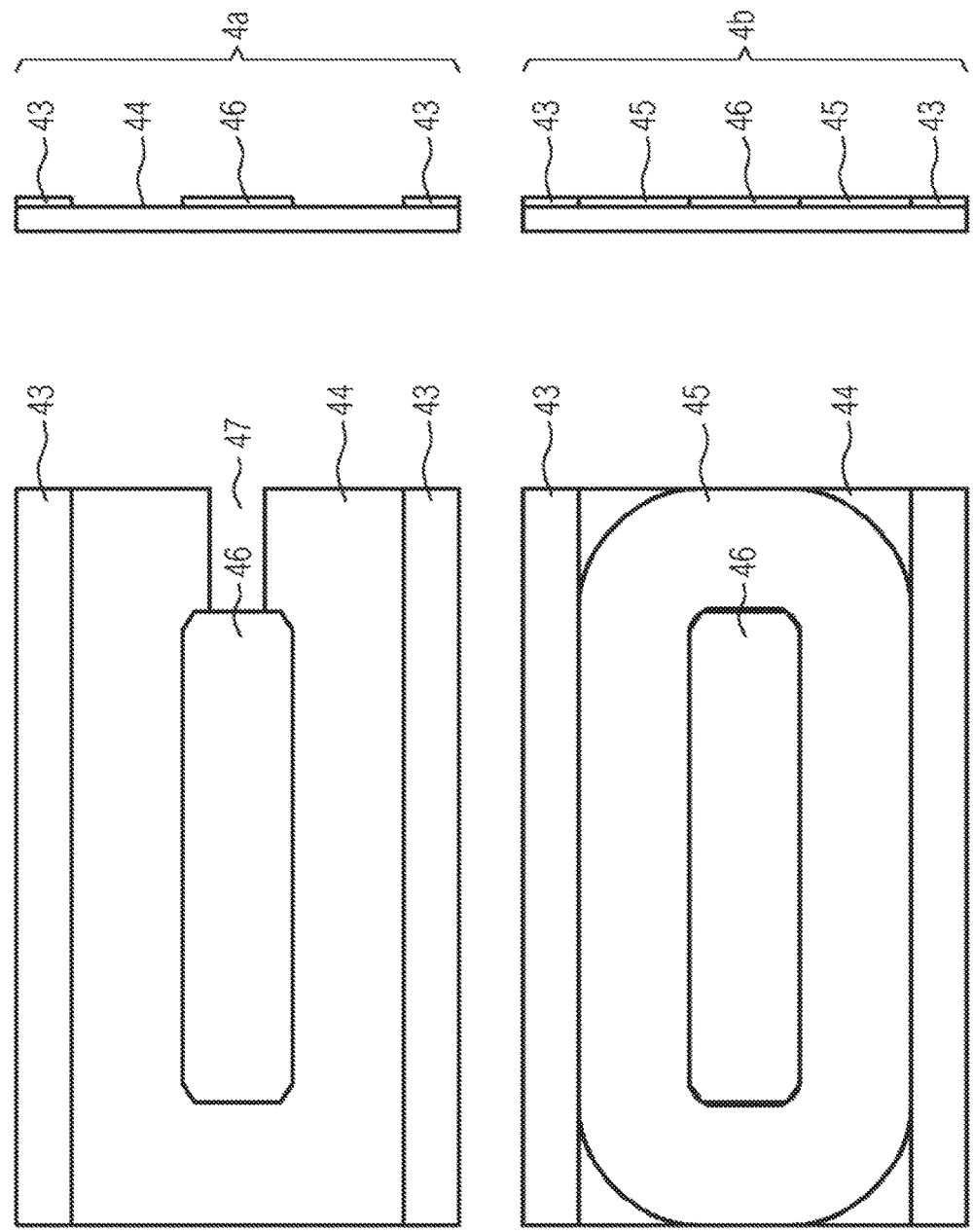

FIG. 4 shows an exemplary embodiment of an induction element with core material for guiding the magnetic field (E-core similar arrangement), wherein in the upper depiction 4a, elevated regions 43, 46 in the profile form a recess 44 in which a stranded-wire coil 45 is provided in the lower depiction 4b. The core material used is ferrite, which is fed into a mold or sleeve made of plastic (not shown). In operation, the stranded-wire coil is aligned in the direction of the air gap or the corresponding induction element (a further induction element is to be arranged in a plane above the cutting plane shown). The core material is grouped around the core for the further guidance of the magnetic field in the direction of the air gap so that the leakage fields remain small toward the exterior and the field energy can be used for the transmission. The induction element shown can be used on both the primary side and the secondary side. The arrangement is very "flat" and therefore particularly suitable for installation beneath the base of a vehicle or on/in a carriageway or a track bed. The flat construction provides a large area for the generation of a large magnetic flux and makes optimal use of the width and length available under the base of a vehicle optimal without impairing the ground clearance. In addition, this construction restricts the mass to very small values. The active components (ferrite and stranded conductors) are kept in shape by a non-magnetic plastic sleeve.

Figure 5:
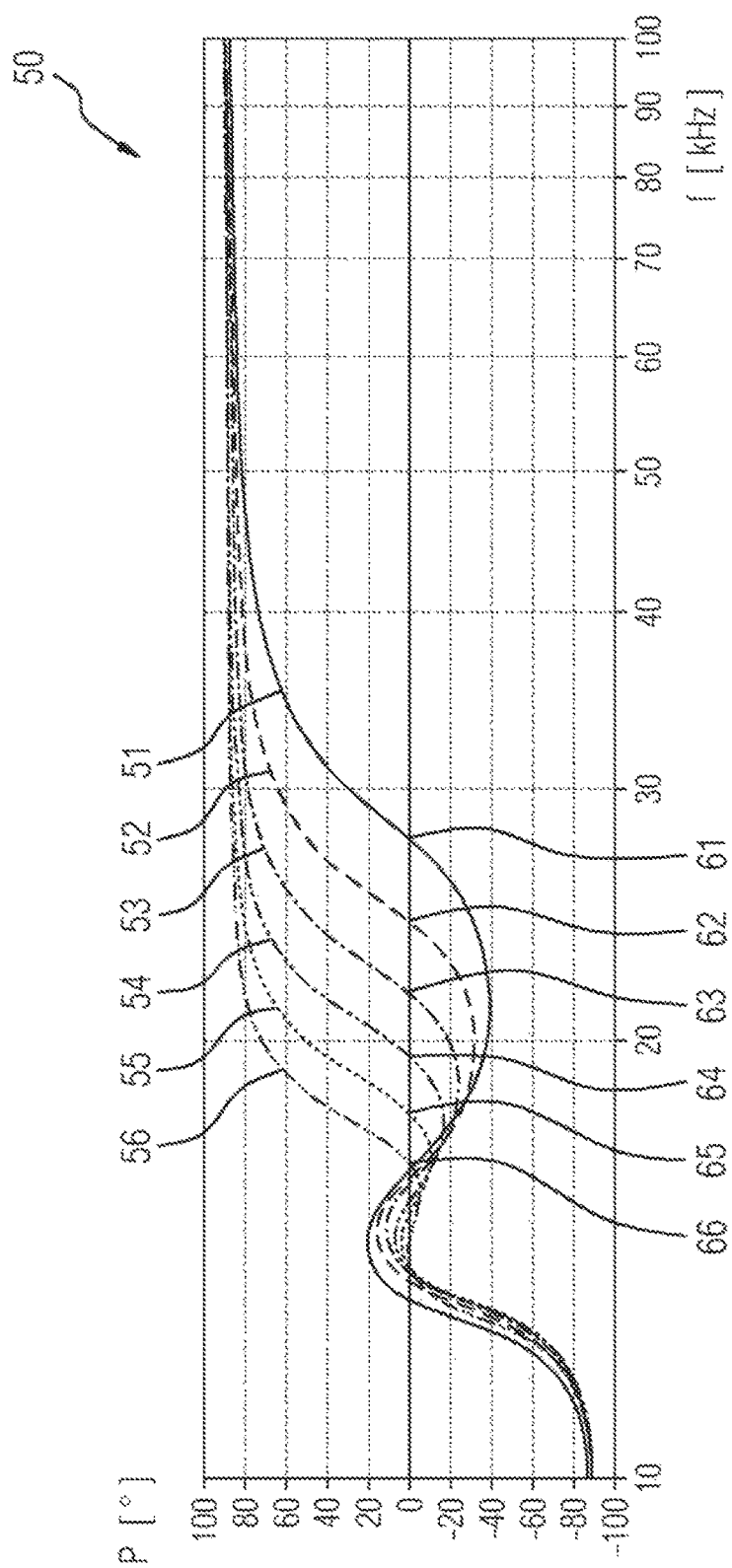

FIG. 5 is a line chart 50 showing a calculated frequency dependency of the phase shift between the primary current and the primary voltage during the energy transmission taking account of the distance between the induction elements. In this case, specific parameters are specified for leakage and principal inductance and compensation capacitor capacitance. Phase response curves 51-56 are simulated on the axes frequency f and phase P, wherein in each case a transmitter-side transmission efficiency of 400 kW is assumed. With the curves 51-56, in each case the distance between the induction elements of a system increases; for the curve 51 it is 98 mm, for the curve 52 it is 119 mm, for the curve 53 it is 140 mm, for the curve 54 it is 161 mm, for the curve 55 it is 182 mm, and for the curve 56 it is 203 mm. At phase angle 0°, the curves 51-56 in each case produce optimal power factor values and hence efficient energy transmission; these are the operating points 61-66 of the system because the energy transmission should have power factors close to 1, i.e. phase shift=0°. It can be identified that, for example, an increase in the air gap (at the same frequency) results in the phase becoming too large. The controller can reset the phase to 0° by lowering the frequency. Under real conditions, the load connected to the system can change the steepness of the curves compared to the ideal course shown in the simulation and a second resonance point can form.

Figure 6:
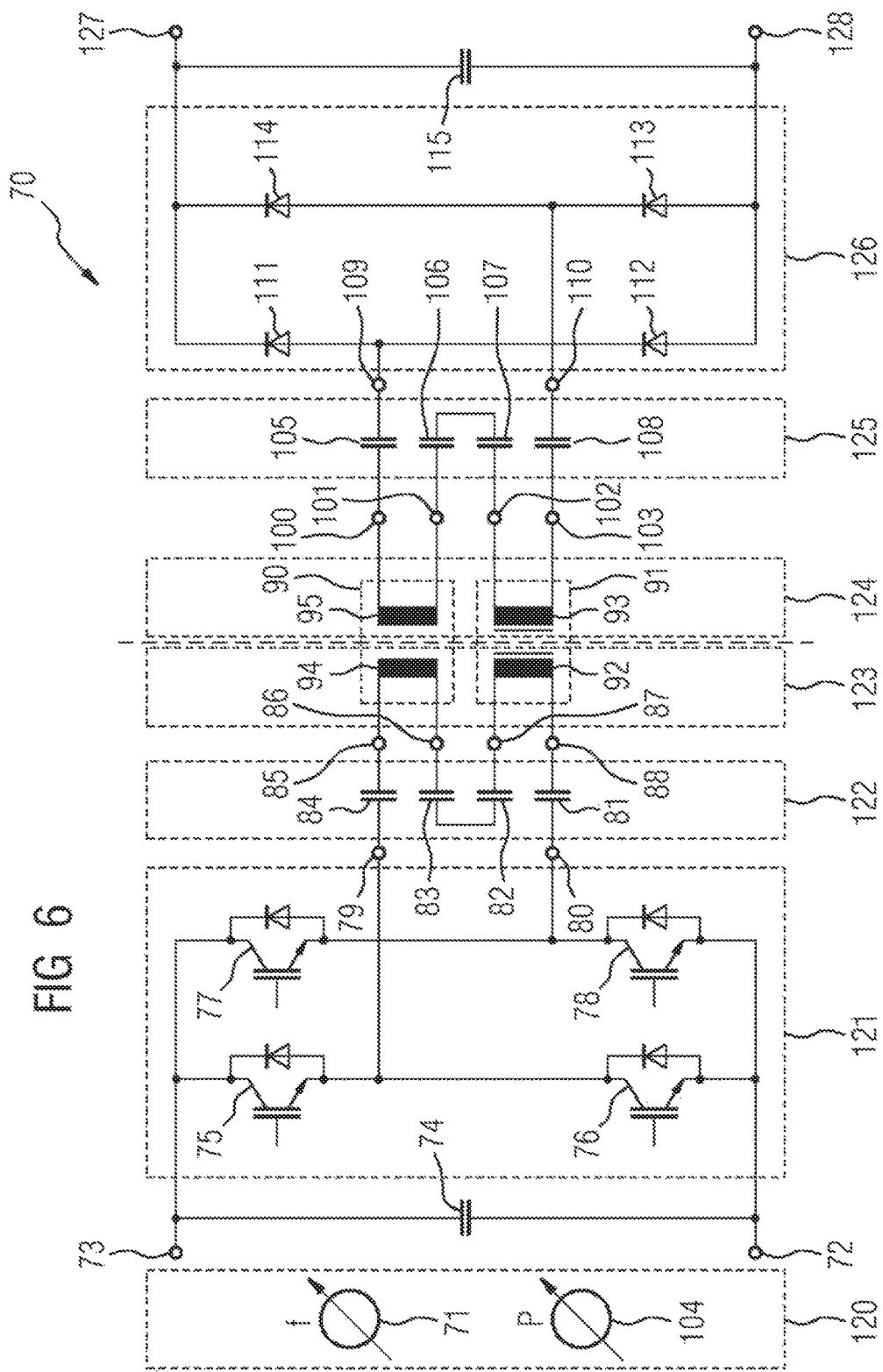

FIG. 6 shows an exemplary embodiment of a system according to the invention as a block diagram with an inverter 121 connected to a DC voltage supply (not shown) at the connection points 72, 73 between which an intermediate circuit capacitor 74 is connected. The DC voltage supply can, for example, be a 750 V DC rail traction current network. The inverter 121 comprises four switchable semiconductor elements 75, 76, 77, 78 for generating an AC voltage. A measuring device 120 uses a frequency-measuring device 71 to detect the frequency f of the primary current and a phase-measuring device to detect the phase P between the primary current and the primary voltage, wherein the primary side is by definition the part of the system with which an AC voltage can be generated by means of the inverter. Resonance capacitors 81-84, 105-108 are arranged in two capacitor arrangements 122, 125 upstream or downstream of the primary or secondary part of the system thus enabling a series circuit or series resonance. On the primary side, the capacitor arrangement 122 is connected to the inverter 121 via connectors 79, 80. A plurality of capacitors are used (in the example, 4 in series, in each case on the primary and secondary sides), so that the voltage stress on each capacitor is lower. To this end, a plurality of connectors 85-88 are led out of the capacitor arrangement 122 in order also to keep the voltage at the transformer windings low. A controller (not shown) uses the measured power output value to control the AC voltage frequency of the inverter (121, 195).

Provided on the primary side are two induction elements 92, 94, which form a primary part 123 and can transmit the energy to two secondary-side induction elements 93, 95 forming a secondary part 124. The secondary-side induction elements 93, 95 are connected to the capacitor arrangement 125 via connectors 100-103 wherein a rectifier 126 is connected downstream of said capacitor arrangement via the connectors 109, 110. The rectifier 126 comprises four diodes 111-114. The rectified voltage can be provided via the connectors 127, 128, wherein an intermediate circuit capacitor 115 is provided. In this case, it also possible to use an existing component, for example an intermediate circuit capacitor of a traction inverter or charging station for an energy store of a vehicle.

The rectifier 121 is, for example, connected to a vehicle bus bar (not shown.). The power can be distributed from there to all consumers as required. To this end, it is, for example, possible to use step-up and step-down converters for the different energy stores known from the prior art, here it is possible to use known control methods—for example by keeping the bus bar voltage at a constant value. Hence, it is possible to operate energy stores of different types or with different powers simultaneously. Defective stores are not supplied since they are disconnected.

Alternatively, a direct energy supply is possible. Instead of connecting the secondary part to the vehicle bus bar, the secondary part is connected to the on-board energy store. The above-defined nominal current of the energy store is impressed. When operating with a transmission ratio of 1:1, the voltage on the primary side is increased until it corresponds to the nominal voltage of the energy store and then the charging process is terminated. This has the advantage that no on-board load points are required. Hence, operation without power specification (no data transmission between the secondary part and the primary part) is possible if pre-defined charging powers/currents are firmly defined.

Figure 7:
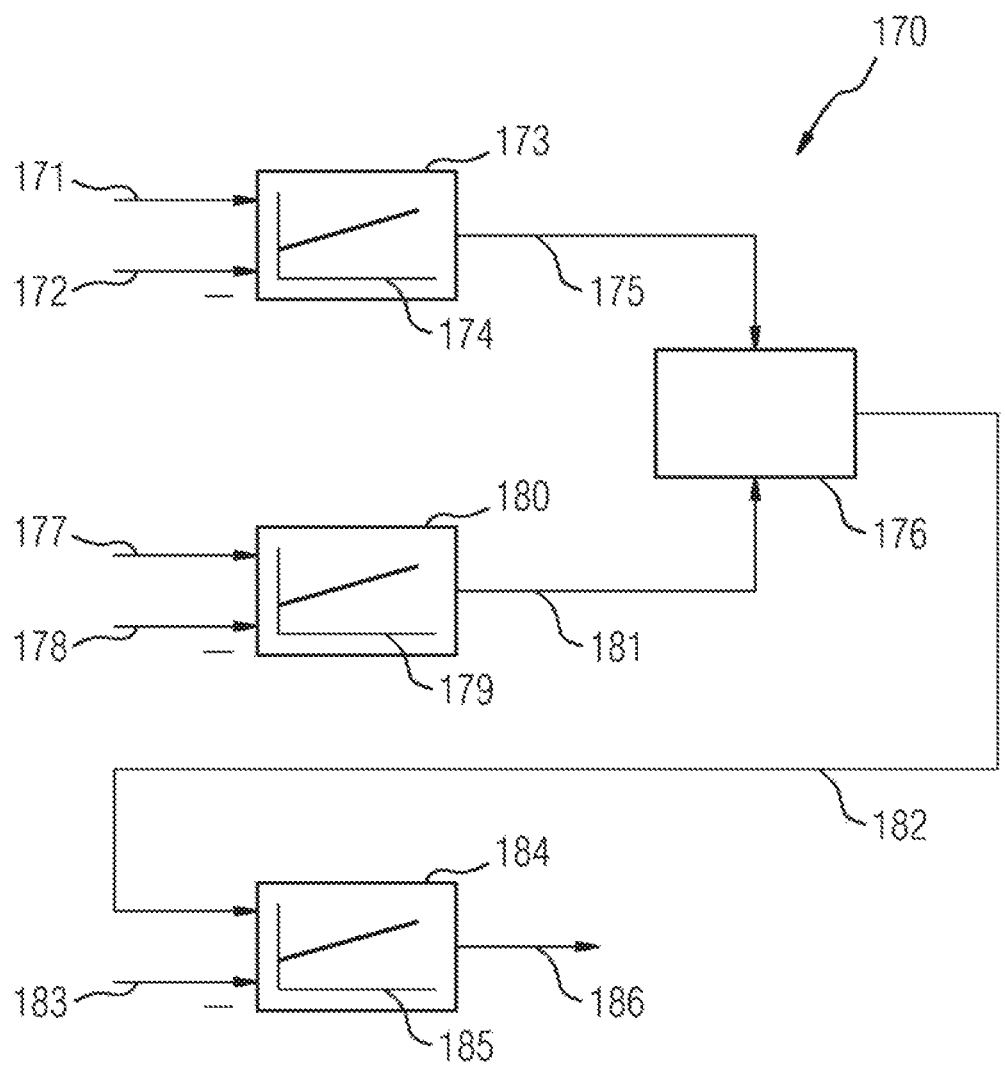

FIG. 7 is a flow diagram of the control of the AC voltage frequency according to the invention such as can be performed by the controller. A power controller 173 receives a reference value 171 and an actual value 172 for the measured power in order to use an internal model 174 to generate a reference value 175 for the phase angle of the primary current. As long as the required power is not exceeded, the power controller specifies 0° for example. A current-limiting controller 180 generates a reference value 181 for the phase angle of the primary current, wherein a maximum value 177 and an actual value 178 for the primary current are specified and an internal model 179 is used. As long as the permissible maximum current is not exceeded, the current-limiting controller specifies 0°. The two phase values 175, 181 are linked via a maximum-forming unit 176 and sent to a frequency controller 184 as a reference phase signal 182. The frequency controller 184 also receives as an input signal an actual value for the phase and controls the desired phase angle using an internal model 185 by adjusting the frequency. A frequency output value 186 is output as an output 186.

Figure 8:
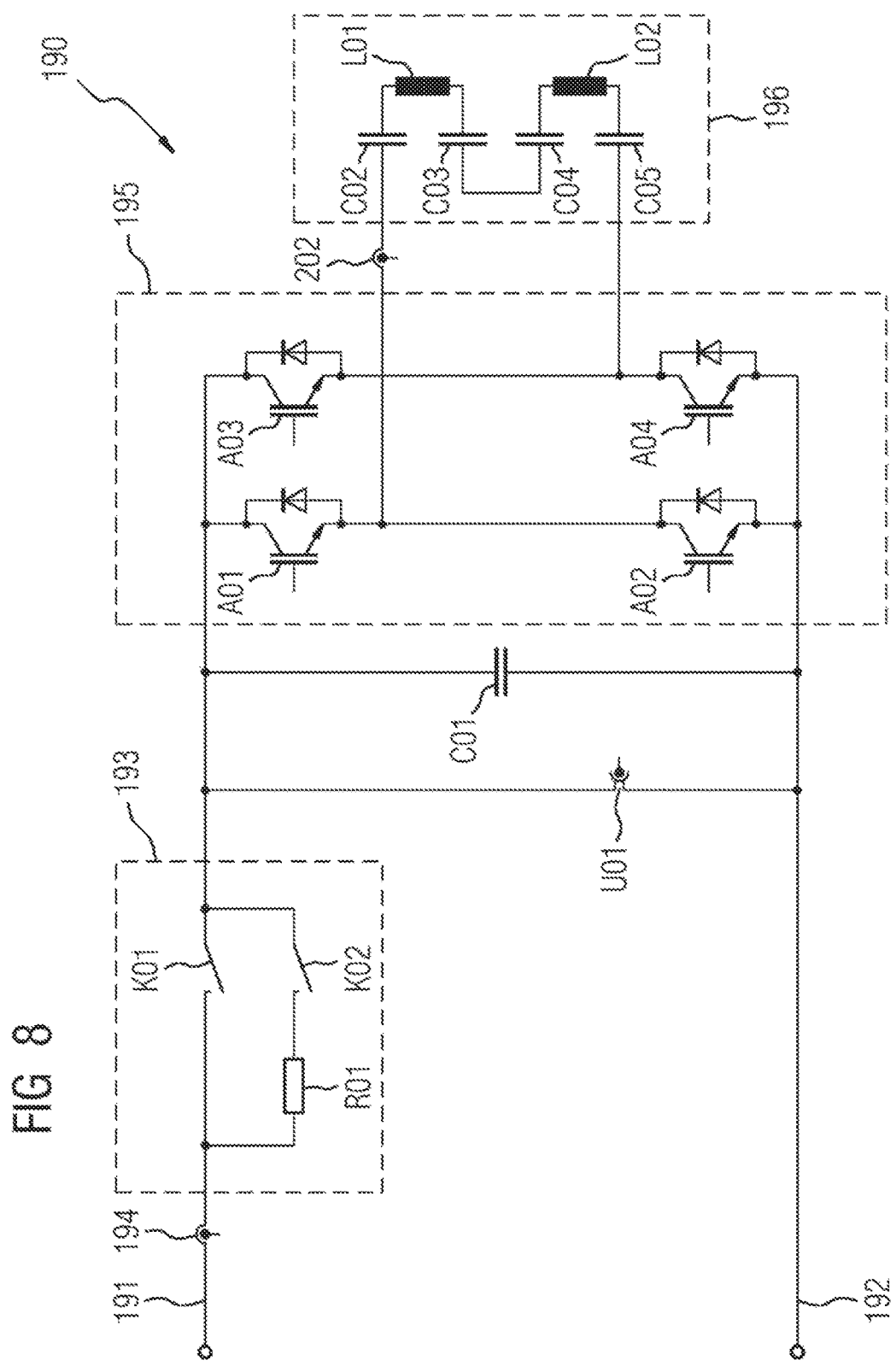

FIG. 8 shows an exemplary embodiment 190 of the arrangement according to the invention with an interrupting device 195 and a precharging device 193. Here, on the primary side, the lines 191 and 192 are connected to an intermediate circuit capacitor C01 which can be precharged to its operating voltage via the precharging device 193 consisting of a resistance ROI and switches K01, K02. The inverter 195 comprises four switchable elements A01-A04, which are suitable for de-energizing the downstream elements 196 in the event of an error. The downstream elements 196 include the primary part with the induction elements L01, L02 and the capacitor arrangement with the capacitors C02-C05. A connection point for a (not shown) mains-current-measuring device (measuring devices are not shown in each case) is provided at the contact point 194, while a voltage-measuring device is provided at contact point U01. At contact point 202, a current-measuring device is arranged downstream of the inverter. A measuring device for measuring a power output value and a controller for controlling the DC voltage frequency of the inverter 195 using the measured power output value are not shown.

Figure 9:
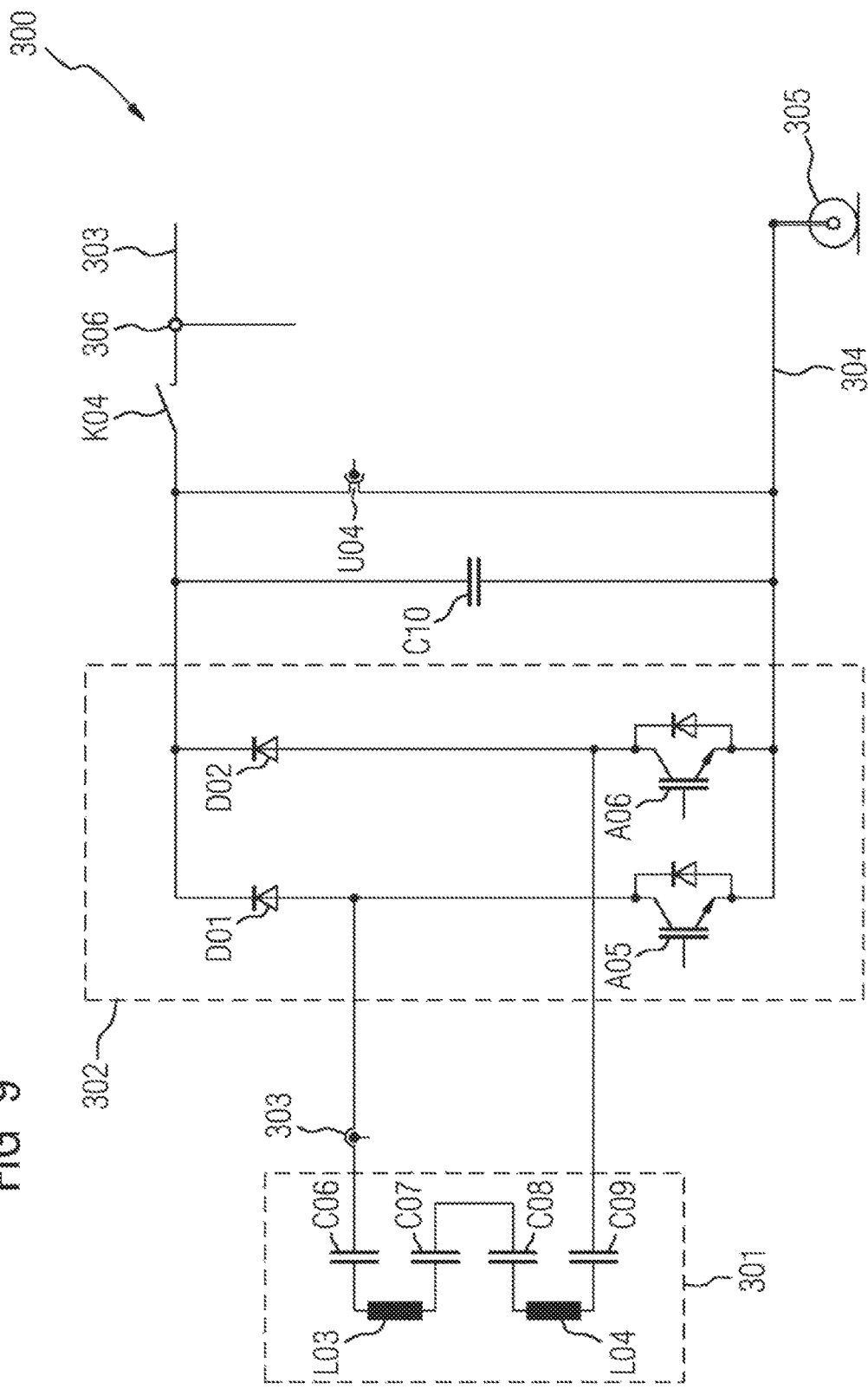

FIG. 9 shows an exemplary embodiment 300 of the receiver side of a system according to the invention with short-circuiters A05, A06. On the secondary side, a rectifier 302 with two diodes D01, D02 and two switchable element A05, A06, which can be used as short circuits is arranged downstream of the unit 301 comprising induction elements L03, L04 and capacitors C06-C09. A current-measuring device (not shown) is connected between the capacitor C06 and the rectifier 302 at contact point 303. The circuit also comprises a backup circuit capacitor C10 and a contact point U04 for connecting a voltage-measuring device; an isolating switch K04 is also provided. Actuators can be connected at contact point 306, optionally with a line reactor and a precharging device for the backup capacitor (not shown in each case).

To enable data transmission between the primary part and the secondary part to be dispensed with, it is possible to use a two-point control principle: on the secondary side, the transformer or the induction element is short circuited when the transmitted power is too high. The system reacts by reducing the transmitted power toward 0. If power is required again, the short circuit is cancelled again. This means that continuous energy transmission does not take place, instead power pulses are emitted.

If impermissible high voltages occur at the secondary side, the system can be protected in that the diodes of the rectifier 302 lying parallel to the switches A05 and A06 are bridges. This advantageously takes place in that the switchable elements A05, A06 are triggered in the case of overvoltage. This interrupts the voltage. On the primary side, this is evident from a sudden change at the resonance point and hence the phase. The controller can control such a case by means of the above-described current limitation so that neither do any impermissible currents occur. The primary side combination of the current controller and power controller makes it possible, even in the case of variable voltages, for the two values to be kept within permissible limits. In a development of the exemplary embodiments shown in FIG. 9, all the diodes of the rectifier 103 are replaced by active switches with antiparallel diodes (not shown); hence the energy transmission can in principle take place in both directions, for example from a stationary store into the secondary side vehicle or from the vehicle toward the stationary store.

The invention claimed is:

1. An arrangement for inductive energy transmission for charging an energy storage device of a rail vehicle, the arrangement comprising:
at least one first induction element associated with a track for the rail vehicle and configured for wirelessly transmitting energy to at least one second induction element;
an inverter having a controllable AC voltage frequency, said inverter being configured for providing an AC voltage with the AC voltage frequency to the at least one first induction element;
a measuring device configured for acquiring a measurement value being a power output value during a wireless transmission of energy from said at least one first induction element to said at least one second induction element; and
a controller connected to said measuring device for receiving the power output value from said measuring device and connected to said inverter, said controller being configured for controlling the AC voltage frequency of the inverter by adjusting down the AC voltage frequency of the inverter from an upper threshold until a predetermined power output value is achieved while energy is being transmitted.

2. The arrangement according to claim 1, wherein the upper threshold lies between 15 kHz and 20 kHz.

3. The arrangement according to claim 1, wherein said measuring device and said controller are configured for using a power factor as the power output value.

4. The arrangement according to claim 3, wherein said measuring device is embodied to determine the power factor from a phase difference between a voltage and a current.

5. The arrangement according to claim 3, wherein said controller is configured to set a power factor of 1 as a standard during the energy transmission.

6. The arrangement according to claim 3, which comprises a communication device configured for receiving signals about a power to be transmitted and/or a power factor that is currently to be set and for transmitting the signals to said controller.

7. The arrangement according to claim 6, wherein said controller is configured to set a power factor of less than 1 using the signals by increasing the AC voltage frequency.

8. The arrangement according to claim 1, wherein said controller is configured, in the event of excessively high currents, to limit the currents by increasing the AC voltage frequency.

9. The arrangement according to claim 8, wherein said controller is configured to adjust the AC voltage frequency within a period of no more than two AC voltage periods to set the predetermined power output value.

10. The arrangement according to claim 1, wherein said measuring device is paired with said at least one first induction element.

11. The arrangement according to claim 1, which comprises at least one first compensation capacitor for compensating a first leakage inductance, wherein said at least one first compensation capacitor is connected in series with said at least one first induction element.

12. The arrangement according to claim 1, which comprises a precharging device for precharging an intermediate circuit capacitor.

13. A system for inductive energy transmission for charging an energy storage device of a rail vehicle, the system comprising:
an arrangement according to claim 1;
at least one second induction element, disposed at a spacing distance from the at least one first induction element and associated with rail vehicle;
a rectifier for providing a direct voltage to the energy storage device of the rail vehicle;
at least one second compensation capacitor for a compensation of a second leakage inductance, said at least one second compensation capacitor being connected in series with said at least one second induction element.

14. The system according to claim 13, wherein said at least one second induction element is arranged substantially coplanar with said at least one first induction element.

15. The system according to claim 13, wherein said first and second induction elements are of equal size.

16. The system according to claim 13, wherein one of said first and second induction elements is larger than the respectively other said induction element so as to compensate for inaccuracies in a positioning of said first and second induction elements relative to one another and to ensure complete coverage of the respectively smaller said induction element by the respectively larger said induction element.

17. The system according to claim 13, wherein said first and second induction elements have a metallic core material for guiding a magnetic field.

18. The system according to claim 17, wherein each of said first and second induction elements comprises at least one core made of stranded conductors enclosing said core material.

19. The system according to claim 13, wherein said controller is configured for controlling the AC voltage frequency continuously during the energy transmission in order to compensate for changes in a spacing distance between the induction elements.

20. The system according to claim 13, wherein the spacing distance lies between 70 mm and 300 mm.

21. The system according to claim 13, wherein in each case a plurality of said compensation capacitors are paired with said at least one first and the at least one second induction elements in order to limit the voltage applied to an individual said compensation capacitor.

22. The system according to claim 13, wherein said at least one first induction element is one of a plurality of first induction elements and said at least one second induction element is one of a plurality of second induction elements.

23. The system according to claim 13, wherein said rectifier comprises switchable semiconductor elements configured for limiting the voltage applied to said at least one second induction element by triggering a short circuit.

24. A method for inductive energy transmission for charging at least one energy storage device of a rail vehicle, the method comprising the following method steps:

feeding an AC voltage with an AC voltage frequency from an inverter to at least one first induction element, wherein the first induction element is paired with a track for the rail vehicle;
controlling the AC voltage frequency of the AC voltage with a controller;
wirelessly transmitting energy from the at least one first induction element to at least one second induction element, wherein the second induction element is paired with the rail vehicle;
measuring a power output value during the wireless energy transmission between the first and second induction elements with a measuring device;
transmitting the measured power output value from the measuring device to the controller;
rectifying an AC voltage at the at least one second induction element with a rectifier to generate a rectified voltage; and
charging the energy storage device of the vehicle with the rectified voltage, and thereby adjusting the AC voltage frequency downward from an upper threshold until a predetermined power output value is achieved during the energy transmission.

25. The method according to claim 24, which comprises compensating leakage inductances with compensation capacitors respectively connected in series with the first and second induction elements.

26. The method according to claim 24, wherein power output value measured by the measuring device is a power factor in the electric circuit of the at least one first induction element.

* * * * *